(12) United States Patent
Ko et al.

(10) Patent No.: US 8,503,106 B2
(45) Date of Patent: Aug. 6, 2013

(54) CAMERA MODULE AND LENS DRIVING DEVICE

(75) Inventors: Hyun Phill Ko, Gyunggi-do (KR); Won Seob Oh, Gyunggi-do (KR); Jae Hyuk Park, Gyunggi-do (KR); Jung Seok Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 220 days.

(21) Appl. No.: 12/926,368

(22) Filed: Nov. 12, 2010

(65) Prior Publication Data

US 2011/0122517 A1 May 26, 2011

(30) Foreign Application Priority Data

Nov. 20, 2009 (KR) .................. 10-2009-0112516

(51) Int. Cl.
*G02B 15/14* (2006.01)
(52) U.S. Cl.
USPC .......................... 359/704; 359/824
(58) Field of Classification Search
USPC .................. 359/703, 704, 822–824
See application file for complete search history.

(56) References Cited

U.S. PATENT DOCUMENTS

| 2007/0133972 | A1 | 6/2007 | Lee et al. |
| 2008/0084620 | A1 | 4/2008 | Lee et al. |
| 2008/0144201 | A1 | 6/2008 | Koc et al. |
| 2008/0297923 | A1 | 12/2008 | Koc et al. |
| 2009/0040361 | A1* | 2/2009 | Heim et al. ............ 348/340 |
| 2009/0268319 | A1 | 10/2009 | Woo et al. |

FOREIGN PATENT DOCUMENTS

| CN | 101153950 | 4/2008 |
| KR | 10-2006-0057117 | 6/2008 |
| KR | 10-2008-0068369 | 7/2008 |
| KR | 10-2009-0063398 | 6/2009 |
| KR | 10-2009-0112319 | 10/2009 |

OTHER PUBLICATIONS

Korean Office Action issued Jun. 9, 2011 in corresponding Korean Patent Application 10-2009-0112516.
Chinese Office Action issued Aug. 22, 2012 in corresponding Chinese Patent Application No. 201010559031.2.
German Office Action mailed Feb. 14, 2013 for corresponding German Application No. 102010050926.4.

* cited by examiner

*Primary Examiner* — Joseph P Martinez (57) ABSTRACT

There is provided a camera module. The camera module includes: a lens barrel including at least one lens; a housing receiving the lens barrel and having an opening in one surface thereof; an actuator driving the lens barrel through the opening; and a preload control part receiving the actuator therein and forming one surface of the housing by being coupled to the opening such that preload generated from the lens barrel and the actuator is controlled.

14 Claims, 6 Drawing Sheets

CAMERA MODULE AND LENS DRIVING DEVICE

CROSS-REFERENCE TO RELATED APPLICATIONS

This application claims the priority of Korean Patent Application No. 10-2009-0112516 filed on Nov. 20, 2009, in the Korean Intellectual Property Office, the disclosure of which is incorporated herein by reference.

BACKGROUND OF THE INVENTION

1. Field of the Invention

The present invention relates to a camera module and a lens driving device, and more particularly, to a camera module mounted on an electronic device and capturing an image, and a lens driving device mounted for the focus control of the camera module.

2. Description of the Related Art

In general, electronic devices or personal mobile terminals such as mobile phones or personal digital assistants (PDA) are equipped with additional functions besides their main functions. Recently, electronic devices having a camera function have become popular among consumers, thereby further expanding the market for camera modules installed therein.

In response to this market demand, camera modules are evolving from performing only simple functions such as fixed focusing to performing additional functions such as auto-focusing, optical zooming and Optical Image Stabilization (OIS).

In particular, in order for camera modules to carry out these additional functions such as auto-focusing, optical zooming and OIS, a lens driving device using an actuator capable of driving a lens is essential.

A lens driving device drives lenses using a driving force generated from an actuator, and thus changes a relative distance between adjacent lenses, thereby performing zooming or focusing.

Lens driving devices using an actuator, which have recently been widely applied to camera modules, are divided into a voice coil motor (VCM) type, a piezo type, a step motor type and the like.

However, such lens driving devices require a number of components, high manufacturing costs, and complicated processes for adjusting the tilt of a lens, and thus cause difficulties in manufacturing. Therefore, techniques contributive to solving the above-described limitations are in demand.

SUMMARY OF THE INVENTION

An aspect of the present invention provides a lens driving device having a structure in which a preload control part including an actuator forms one surface of a housing, and a camera module including the same.

According to an aspect of the present invention, there is provided a camera module including: a lens barrel including at least one lens; a housing receiving the lens barrel and having an opening in one surface thereof; an actuator driving the lens barrel through the opening; and a preload control part receiving the actuator therein and forming one surface of the housing by being coupled to the opening such that preload generated from the lens barrel and the actuator is controlled.

The preload control part of the camera module may include a tilt control portion contacting the lens barrel and adjusting a tilt of the lens barrel.

The tilt control portion of the camera module may be formed as a curved surface so as to contact an outer side of the lens barrel having a cylindrical shape.

The preload control part of the camera module may include: a spring contacting the housing and controlling the preload; and a spring mounting portion having a shape corresponding to the spring such that the spring is mounted therein.

The preload control part of the camera module may include a receiving portion receiving the actuator therein.

The preload control part of the camera module may include one or more preload control holes in one surface of the preload control part opposite to another surface thereof contacting the lens barrel.

The preload control holes of the camera module may be formed in the four corners of the one surface, respectively.

The camera module may further include a bearing part formed on a surface of the lens barrel opposite to another surface thereof contacting the preload control part.

The actuator of the camera module may include: a piezoelectric device formed of a piezoelectric body; and a friction member attached to a front surface of the piezoelectric device and contacting the lens barrel.

According to another aspect of the present invention, there is provided a lens driving device mounted in a camera module and driving a lens barrel in an optical axis direction, the lens driving device including: an actuator driving the lens barrel through an opening formed in a housing in which the lens barrel is mounted; and a preload control part housing the actuator therein and forming the housing by being coupled to the opening such that preload generated from the lens barrel and the actuator is controlled.

The preload control part of the lens driving device may include a tilt control portion contacting the lens barrel and adjusting a tilt of the lens barrel.

The tilt control portion of the lens driving device may be formed as a curved surface to contact an outer side of the lens barrel having a cylindrical shape.

The preload control part of the lens driving device may include: a spring contacting the housing and controlling the preload; and a spring mounting portion having a shape corresponding to the spring such that the spring is mounted therein.

The preload control part of the lens driving device may include a receiving portion receiving the actuator therein.

The preload control part of the lens driving device may include one or more preload control holes in one surface of the preload control part opposite to another surface thereof contacting the lens barrel.

The preload control holes of the lens driving device may be formed in the four corners of the one surface, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. A camera module and a lens driving device according to exemplary embodiments of the present invention will now be described with reference to FIGS. 1 through 6.

The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

The same or equivalent elements are referred to as the same reference numerals throughout the specification.

Figure 1:
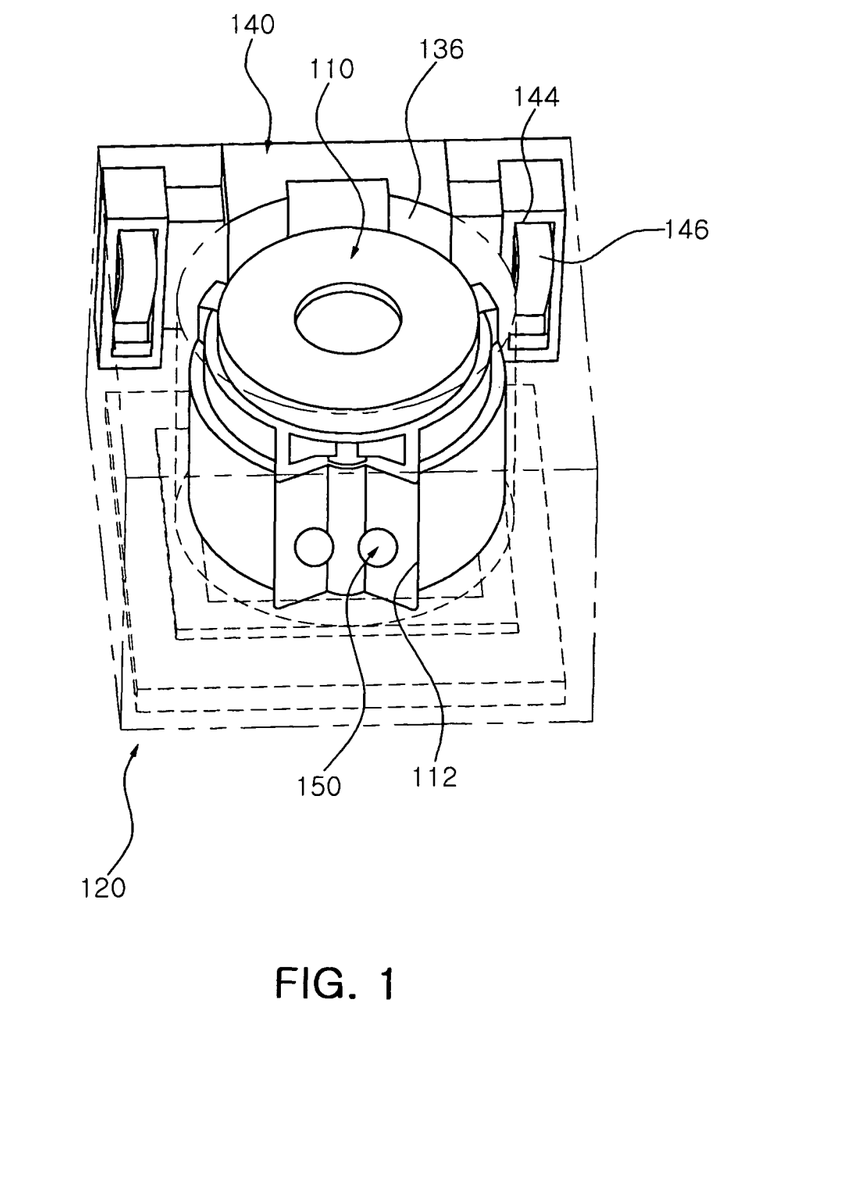
FIG. 1 is a schematic perspective view illustrating a camera module according to an exemplary embodiment of the present invention.
Figure 2:
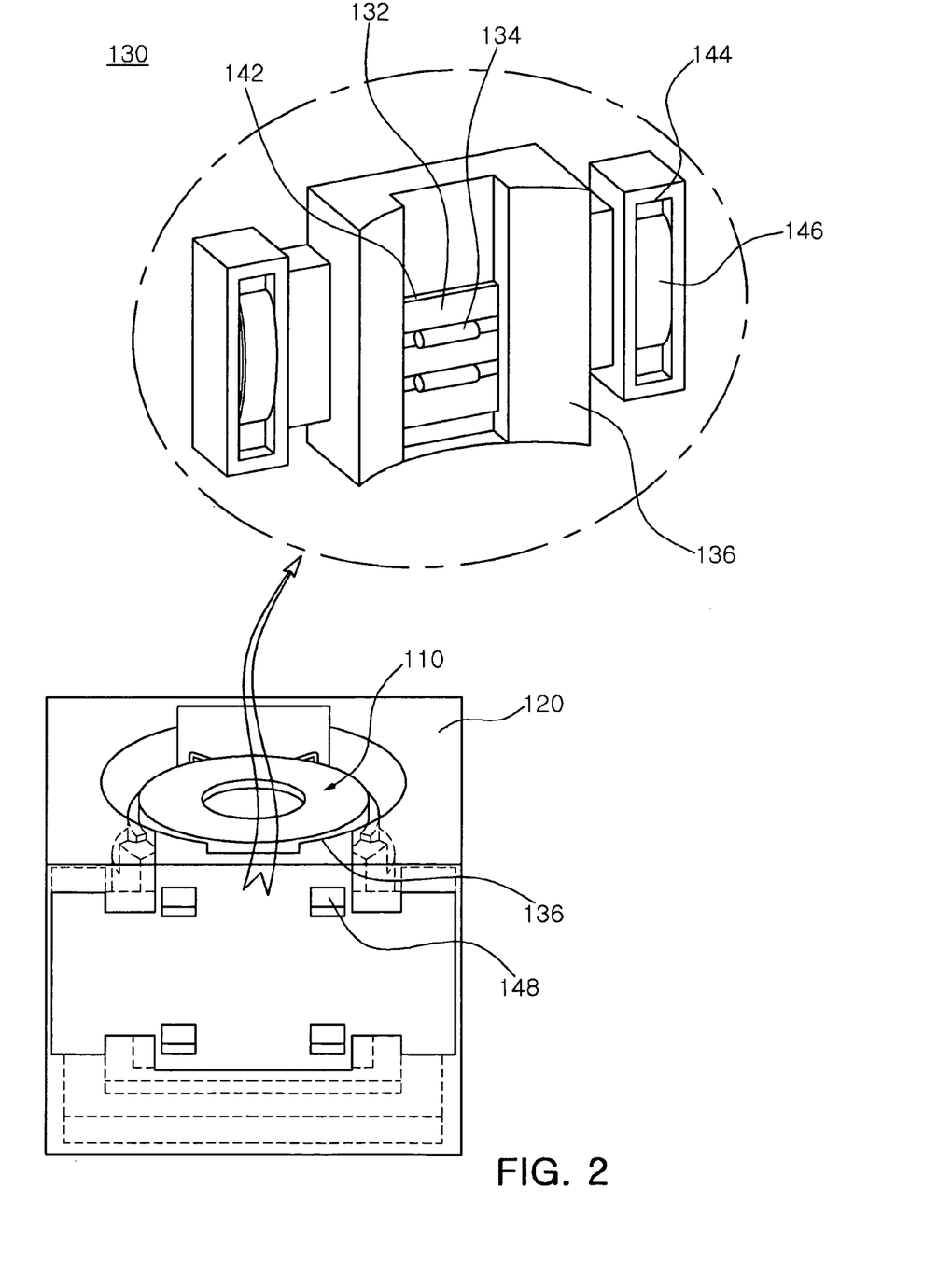
FIG. 2 is a perspective view illustrating a lens driving device in the camera module depicted in FIG. 2.
Figure 3:
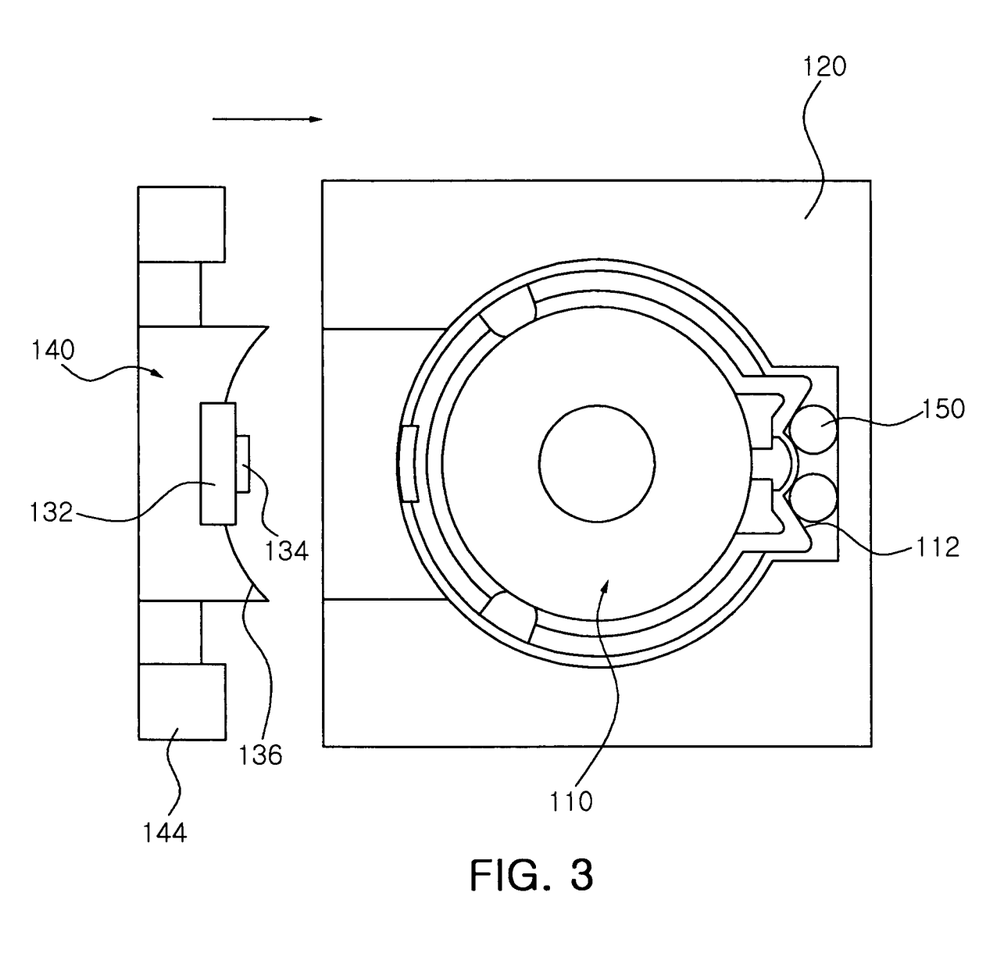
FIG. 3 is a schematic side view illustrating the camera module depicted in FIG. 1.

FIG. 1 is a schematic perspective view illustrating a camera module according to an exemplary embodiment of the present invention. FIG. 2 is a perspective view illustrating a lens driving device in the camera module depicted in FIG. 1. FIG. 3 is a schematic side view illustrating the camera module depicted in FIG. 1.

Referring to FIGS. 1 and 2, a camera module may include a lens barrel 110, a housing 120, and a lens driving device 130.

The lens barrel 110 accommodates at least one lens therein, and may be mounted by being inserted into the inner space of the housing 120. Therefore, the lens barrel 110 has a cylindrical shape. However, the shape of the lens barrel 110 is not limited to the above-described shape, and may be designed variously according to a designer's intention.

A barrel recess 112 is formed in the side surface of the lens barrel 110, and receives one surface of a bearing part 150 mounted in the housing 120. Since the bearing part 150 is mounted in the barrel recess 112, frictional force generated between the lens barrel 120 and the housing 120 is reduced when the lens barrel 110 is moved.

In this case, the bearing part 150 has a structure in which two balls are mounted in the barrel recess 112 between the housing 120 and the lens barrel 120. This structure facilitates its manufacturing process. The simple structure of the bearing part 150 contributes to lowering manufacturing costs and simplifying manufacturing processes.

However, according to this exemplary embodiment, a driving unit is not limited to the bearing part 150, and may utilize a separate guide unit. The driving unit may also be designed as a structure that slides along a guide bar or the like. Alternatively, according to another exemplary embodiment, a screw thread may be formed around the outside of the lens barrel 110 and coupled with a screw thread formed on the inner portion of the housing 120. The lens barrel 110 may include a separate fixing structure that fixes the bearing part 150.

The housing 120 has an inner space with an open top and bottom. The inner space of the housing 120 may be divided into upper and lower spaces that communicate with each other. The lens barrel 110 is received in the upper space of the housing 120.

Herein, the term "upper" as in the upper space of the housing 120 refers to a direction toward an object, and the term "lower" as in the lower space of the housing 120 refers to an imaging direction in which an image is formed.

In this case, the side surface of the housing 120 may have an opening such that a preload control part 140 is bonded thereto. Therefore, after the lens barrel 110 is mounted in the housing 120, the preload control part 140 is bonded with the opening of the housing 120 by using an adhesive, to thereby seal the inner space of the housing 120.

Here, the entire side surface of the housing 120 may be opened. Alternatively, the side surface of the housing 120 may be partially opened in the form of a recess in order to house the preload control part 140. For example, assuming that the area of the entire side surface of the housing 120 is 100, the area of the opening thereof may range from approximately 20 to 100. However, the present invention is not limited to the above-described numerical value.

The housing 120 may be installed in cameras for personal mobile terminals, hard disc drives, digital cameras or the like, and is not limited to mounting on camera devices.

Further, an image sensor or the like, although not essential for the present invention, may be mounted inside the housing 120. Here, the image sensor has an imaging plane on its upper surface so as to form an image using light incident thereon through an infrared (IR) filter or a lens, which is capable of filtering infrared rays among rays having passed through the lens.

Also, the lens driving device 130 may be received in the side surface of the housing 120 adjacent to the lens barrel 110. Accordingly, the lens driving device 130 comes in contact with the lens barrel 110, and moves the lens barrel 110 up and down (i.e., vertically) by the driving of an actuator 132 according to voltage inside the lens driving device 130.

In this case, the movement of the lens barrel 110, caused by the lens driving device 130, may be detected by a separately mounted positioning sensor (not shown). On the basis of the detected quantity of vertical motion, external force that drives the lens barrel 110 vertically is appropriately controlled. However, this construction may be omitted.

Figure 4:
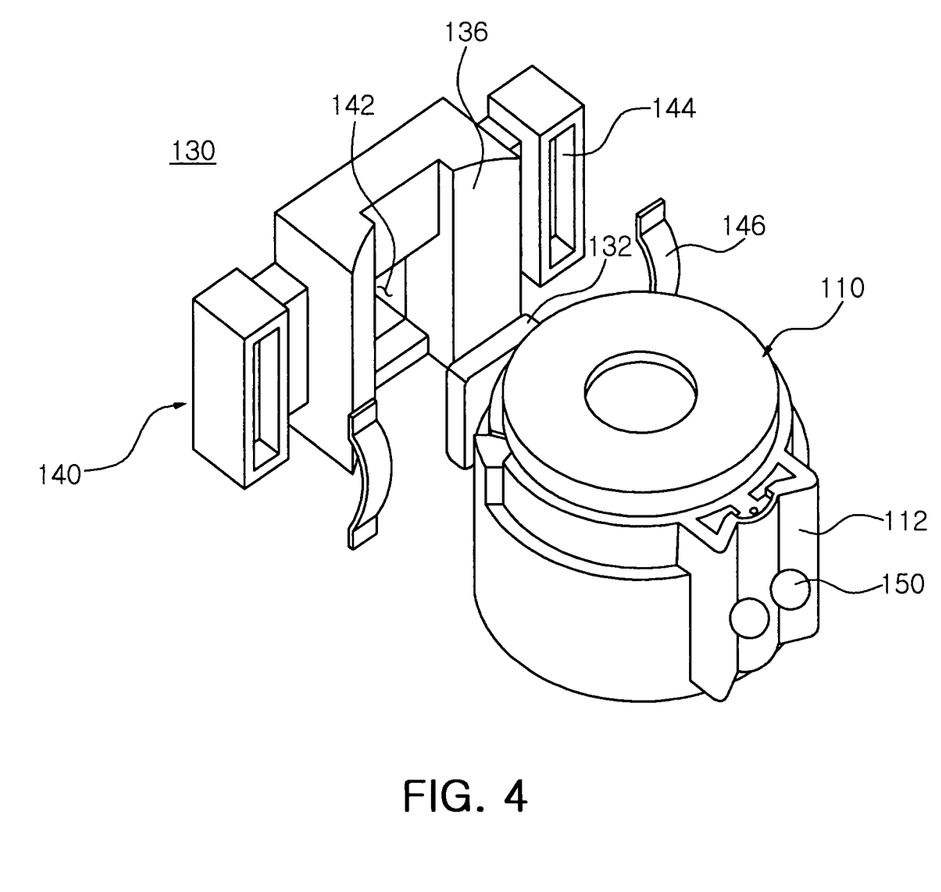
FIG. 4 is a perspective view illustrating a lens driving device according to an exemplary embodiment of the present invention.
Figure 5:
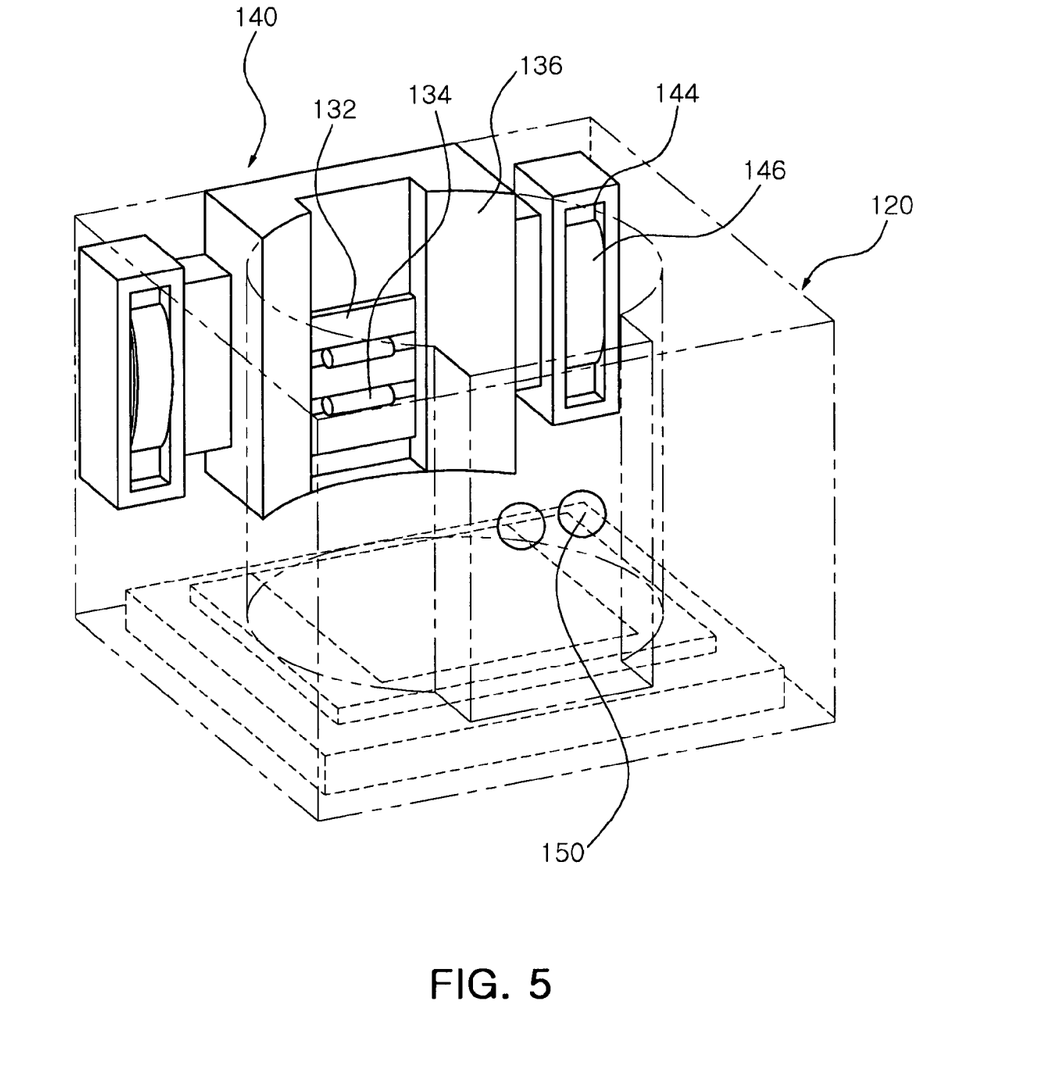
FIG. 5 is a schematic perspective view in which the illustration of a lens barrel is omitted in order to illustrate how the lens driving device depicted in FIG. 4 is mounted.

FIG. 4 is a perspective view illustrating the lens driving device according to an exemplary embodiment of the present invention. FIG. 5 is a schematic perspective view in which the illustration of the lens barrel is omitted in order to describe how the lens driving device, depicted in FIG. 4, is mounted.

Referring to FIGS. 4 and 5, the lens driving device 130 is mounted on the housing 120 and located adjacent to the lens barrel 110. The lens driving device 130 may include the actuator 132 and the preload control part 140.

In this case, the actuator 132 may be mounted in the inner space of the preload control part 140, and may be a piezoelectric device. In detail, the piezoelectric device is formed by stacking a plurality of piezoelectric ceramic sheets of multiple ceramics. An inner electrode may be formed on the piezoelectric ceramic sheets such that the piezoelectric device is divided into a plurality of oscillators.

However, according to this exemplary embodiment, the actuator is not limited to the piezoelectric device, and may be a voice coil motor, an electric viscous fluid, or a shape memory alloy.

Also, a friction member 134, contacting the lens barrel 110, may be provided on the front side of the actuator 132. Accordingly, the friction member 134 pushes the lens barrel 110 up and down by the mechanical motion of the actuator 132, to thereby move the lens barrel 110 up and down.

Although not shown in this exemplary embodiment, the lens barrel 110 may be provided with a friction material corresponding to the friction member 134.

The preload control part 140 includes a receiving portion 142 for housing the actuator 132 in its central portion. A spring mounting portion 144 may be formed at both ends of the receiving portion 142 to receive a spring therein and adjust preload.

Here, the receiving portion 142 may be recessed into the preload adjusting part 140, but is not limited thereto. Alternatively, the receiving portion 142 may be provided in the form of a hole penetrating the preload adjusting part 140, so that a substrate or the like, which is electrically connected with the actuator 132, can be mounted from the outside.

Here, springs 146, mounted on the preload control part 140, may utilize leaf springs, but are not limited thereto. The springs 146 may be configured as various elastic members such as coil springs according to a designer's intention.

According to this exemplary embodiment of the present invention, the spring mounting portion 144 may be formed at both sides of the receiving portion 142, but is not limited thereto. Alternatively, the spring mounting portion 144 may be formed at only one side portion of the receiving portion 142 or may be formed on the top and bottom of the receiving portion 142. Also, a plurality of spring mounting portions 144 may be provided, and a plurality of springs may be mounted therein.

Accordingly, the spring 146 provided in the spring mounting portion 144 comes in contact with the inner side surface of the housing 120 and generates predetermined pressure so as to maintain contact between the friction member 134 of the actuator 132 and the lens barrel 110.

Further, the preload control part 140 may include a tilt control portion 136 contacting the lens barrel 110 and adjusting a tilt of the lens barrel 110.

In this case, the tilt control portion 136 may be curved corresponding to the outer shape of the lens barrel 110. Thus, the preload control part 140 and the lens barrel 110 may be tightly attached to each other as an integral assembly.

According to this exemplary embodiment, one tilt control portion 136 is elongated along the side surface of the preload control part 140, but is not limited thereto. Alternatively, a plurality of tilt control portions may be formed locally along the side surface of the preload control part 140.

According to this exemplary embodiment, the tilt control portion 136 is formed as an integral part of the preload control part 140, but is not limited thereto. Alternatively, a separately formed tilt control portion may be assembled according to a designer's intention.

Accordingly, as shown in FIG. 3, the lens driving device 130 is assembled by placing the lens driving device 130 in the opening of the housing 120 and moving it toward the housing 120 (see arrow in drawing).

In this case, the lens driving device 130 is bonded to the opening of the housing 120 by using an adhesive. When a relatively large level of preload is desired, the lens driving device 130 is moved further toward the inside of the housing 120. When a relatively small level of preload is desired, the lens driving device 130 is moved further toward the outside of the housing 120.

In this case, the adhesive may utilize an ultraviolet (UV) adhesive, a thermal adhesive or the like. However, the present invention is not limited to the use of such an adhesive, and a separate coupling structure such as a sliding structure or a screw coupling protrusion may be adopted instead of the adhesive.

By the above-described process, the lens driving device 130 closes the opening of the housing 120, and is thus assembled as if it forms (constitutes) the housing 120. Further, the lens driving device 130 and the housing 120 are bonded with each other after the lens driving device 130 is placed on its assembly position inside the housing 120. This bonding process allows a designer to achieve a desired preload between the actuator 132 and the lens barrel 110 by adjusting the position of the lens driving device 130.

Figure 6:
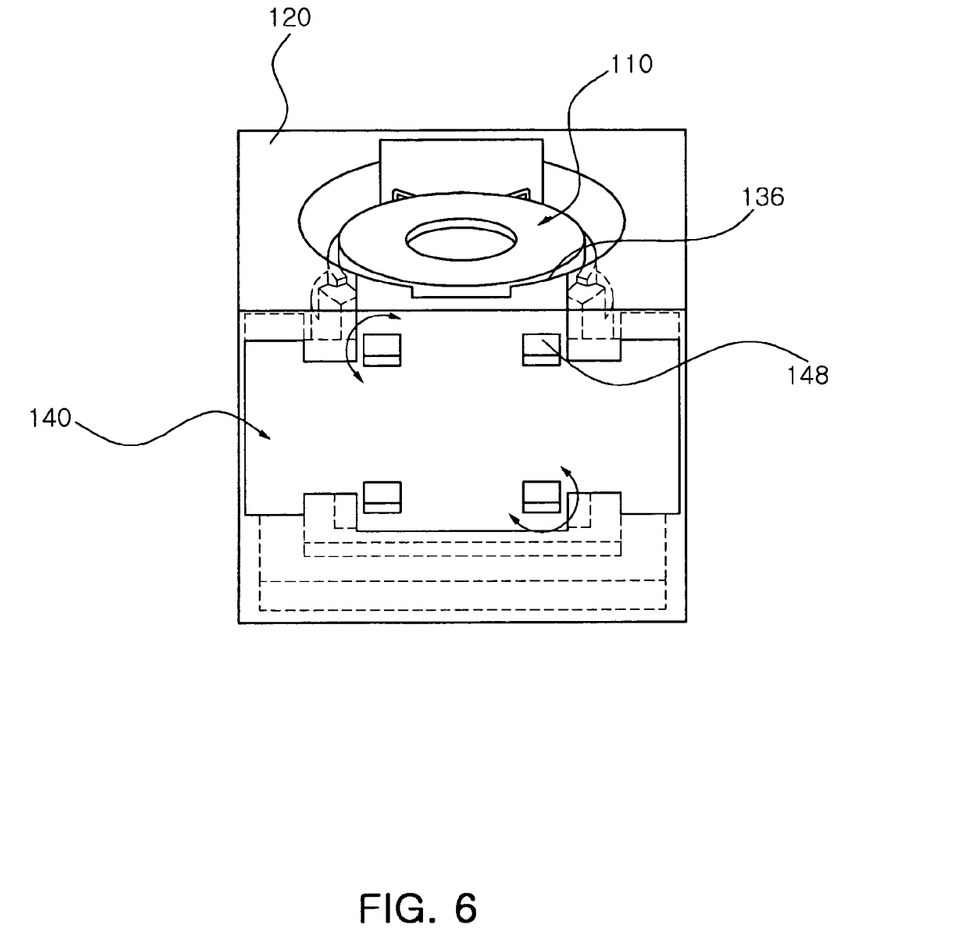
FIG. 6 is a perspective view illustrating a method of controlling a tilt in a camera module according to an exemplary embodiment of the present invention.

FIG. 6 is a perspective view for describing a method of controlling a tilt in the camera module, according to an exemplary embodiment of the present invention.

Referring to FIG. 6, as stated above, the preload control part 140 may include the tilt control portion 136 that adjusts a tilt of the lens barrel 110 by contacting the lens barrel 110.

In this case, the tilt control portion 136 may have a curved shape corresponding to the outer shape of the lens barrel 110. Accordingly, the preload control part 140 and the lens barrel 110 are tightly attached to each other as an integral assembly.

Also, preload control holes 148 may be formed in the four corners of the rear surface of the preload control part 140, respectively. However, the number of preload control holes 148 is not limited to the above description. The location and number of preload control holes 148 may be determined according to a designer's intention.

Therefore, when the position of the preload control part 140, closely attached to the lens barrel 110, is changed by using the preload control holes 148 (see arrows in FIG. 6), the position of the lens barrel 110 may also be changed as much as the preload control part 140 is moved. Thus, the lens barrel 110 is prevented from tilting, by simply changing the position of the lens barrel 110 from the outside.

According to this exemplary embodiment, a separate process for adjusting a tilt of the lens barrel is unnecessary. Further, a test and adjustment for preventing defects caused by the tilting of the lens barrel is carried out in an assembly process. Thus, defects caused by the tilting of the lens barrel 110, which occur frequently during an image test, can be easily prevented, thereby allowing for the enhancement of image quality.

As set forth above, in the camera module and the lens driving device according to exemplary embodiments of the invention, the preload control part receives the actuator therein, and forms (constitutes) the housing by being coupled into the opening of the housing such that preload generated between the lens barrel and the actuator is controlled. Thus, preload can be simply controlled to a desired level from the outside, and a tilt of the lens barrel can be easily corrected.

While the present invention has been shown and described in connection with the exemplary embodiments, it will be apparent to those skilled in the art that modifications and variations can be made without departing from the spirit and scope of the invention as defined by the appended claims.

What is claimed is:
1. A camera module comprising:
a lens barrel including at least one lens;
a housing receiving the lens barrel and having an opening in one surface thereof;
an actuator driving the lens barrel through the opening; and
a preload control part receiving the actuator therein and forming one surface of the housing by being coupled to the opening such that preload generated from the lens barrel and the actuator is controlled, the preload control part including a tilt control portion contacting the lens barrel and adjusting a tilt of the lens barrel.

2. The camera module of claim 1, wherein the tilt control portion is formed as a curved surface so as to contact an outer side of the lens barrel having a cylindrical shape.

3. The camera module of claim 1, wherein the preload control part includes:
   a spring contacting the housing and controlling the preload; and
   a spring mounting portion having a shape corresponding to the spring such that the spring is mounted therein.

4. The camera module of claim 1, wherein the preload control part includes a receiving portion receiving the actuator therein.

5. The camera module of claim 1, further comprising a bearing part formed on one surface of the lens barrel opposite to another surface thereof contacting the preload control part.

6. A camera module comprising:
   a lens barrel including at least one lens;
   a housing receiving the lens barrel and having an opening in one surface thereof;
   an actuator driving the lens barrel through the opening; and
   a preload control part receiving the actuator therein and forming one surface of the housing by being coupled to the opening such that preload generated from the lens barrel and the actuator is controlled, the preload control part including one or more preload control holes in one surface of the preload control part opposite to another surface thereof contacting the lens barrel.

7. The camera module of claim 6, wherein the preload control holes are formed in four corners of the one surface, respectively.

8. A camera module comprising:
   a lens barrel including at least one lens;
   a housing receiving the lens barrel and having an opening in one surface thereof;
   an actuator driving the lens barrel through the opening, the actuator including
      a piezoelectric device formed of a piezoelectric body, and
      a friction member attached to a front surface of the piezoelectric device and contacting the lens barrel; and
   a preload control part receiving the actuator therein and forming one surface of the housing by being coupled to the opening such that preload generated from the lens barrel and the actuator is controlled.

9. A lens driving device mounted in a camera module and driving a lens barrel in an optical axis direction, the lens driving device comprising:
   an actuator driving the lens barrel through an opening formed in a housing in which the lens barrel is received; and
   a preload control part housing the actuator therein and forming the housing by being coupled to the opening such that preload generated from the lens barrel and the actuator is controlled, the preload control part including a tilt control portion contacting the lens barrel and adjusting a tilt of the lens barrel.

10. The lens driving device of claim 9, wherein the tilt control portion is formed as a curved surface to contact an outer side of the lens barrel having a cylindrical shape.

11. The lens driving device of claim 9, wherein the preload control part includes:
    a spring contacting the housing and controlling the preload; and
    a spring mounting portion having a shape corresponding to the spring such that the spring is received therein.

12. The lens driving device of claim 9, wherein the preload control part includes a receiving portion receiving the actuator therein.

13. A lens driving device mounted in a camera module and driving a lens barrel in an optical axis direction, the lens driving device comprising:
    an actuator driving the lens barrel through an opening formed in a housing in which the lens barrel is received; and
    a preload control part housing the actuator therein and forming the housing by being coupled to the opening such that preload generated from the lens barrel and the actuator is controlled, the preload control part including one or more preload control holes in one surface of the preload control part opposite to another surface thereof contacting the lens barrel.

14. The lens driving device of claim 13, wherein the preload control holes are formed in four corners of the one surface, respectively.

* * * * *